United States Patent [19]
Koch

[11] Patent Number: 4,599,562
[45] Date of Patent: Jul. 8, 1986

[54] METHOD AND APPARATUS FOR MAGNETICALLY MEASURING A COATING WITH A PLURALITY OF MAGNETS

[75] Inventor: Frank Koch, Ogdensburg, N.Y.

[73] Assignee: DeFelsko Corporation, Ogdensburg, N.Y.

[21] Appl. No.: 658,215

[22] Filed: Oct. 10, 1984

Related U.S. Application Data

[63] Continuation-in-part of Ser. No. 549,569, Nov. 7, 1983, abandoned.

[51] Int. Cl.⁴ .............................................. G01B 7/10
[52] U.S. Cl. .................. 324/230; 33/169 F; 73/150 R
[58] Field of Search ............... 324/200, 202, 226–231, 324/262; 33/169 F; 73/150 R

[56] References Cited

U.S. PATENT DOCUMENTS

| | | | |
|---|---|---|---|
| 2,571,488 | 10/1951 | Rooney | 324/230 |
| 2,625,585 | 1/1953 | Krouse | 324/230 X |
| 2,637,115 | 5/1953 | Watson | 324/228 X |
| 3,716,779 | 2/1973 | Akulov | 324/230 |
| 4,005,360 | 1/1977 | Ott | 324/230 |
| 4,041,378 | 8/1977 | Ott | 324/230 X |
| 4,291,270 | 9/1981 | Lukhvich et al. | 324/230 |
| 4,392,305 | 7/1983 | Nix et al. | 324/230 X |

Primary Examiner—Gerard R. Strecker
Assistant Examiner—Warren S. Edmonds
Attorney, Agent, or Firm—Burns, Doane, Swecker & Mathis

[57] ABSTRACT

A method and apparatus are disclosed for magnetically measuring a coating on a magnetizable material. The apparatus includes a plurality of magnets flexibly connected to one another with the magnets preferably provided on a strap of flexible material. Each magnet has a coating with a predetermined thickness provided over only a first portion of the magnet and preferably over one pole of the magnet. The coating of each of the plurality of magnets differs in thickness from one to another. The magnets contact the coating to be measured at a second portion of the magnets and the coating of each magnet is then contacted sequentially with a member of a magnetizable material. If the magnet is lifted with the member, the coating to be measured is greater than the thickness of the coating of the magnet. If the magnet is not lifted with the member, the coating to be measured is less than the thickness of the coating of the magnet. In this way, the thickness of the coating to be measured is determined to be between the predetermined thicknesses of the coatings of the two magnets. In another embodiment, instead of a coating, each magnet is positioned within a rivet such that one end of the magnet is recessed from a rim on one side of the rivet. The lifting member of this embodiment is applied against the rim over each magnet.

34 Claims, 12 Drawing Figures

METHOD AND APPARATUS FOR MAGNETICALLY MEASURING A COATING WITH A PLURALITY OF MAGNETS

This application is a continuation-in-part of the co-pending application Ser. No. 549,569, filed Nov. 7, 1983 now abandoned.

BACKGROUND AND SUMMARY OF THE PRESENT INVENTION

The present invention relates generally to gauges for measuring coatings on magnetizable materials and more particularly relates to gauges for magnetically measuring the thickness of a coating on a magnetizable material.

Many gauges and methods are known for measuring the thickness of a coating on a magnetizable material. These gauges have varying degrees of complexity with many gauges now employing electronic circuitry in order to provide a more accurate measurement of the coating thickness.

Generally, these gauges can be readily classified in a relatively small number of categories. The majority of these gauges utilize spring tension or an electromagnetic field as a significant part of the device.

In U.S. Pat. No. 2,571,488 of J. T. Rooney which issued on Oct. 16, 1951, a thickness measuring device is disclosed wherein gravity is utilized to measure the thickness of a coating to be measured. A magnet is provided at the end of a pendulum, and the coating to be measured is placed adjacent to one pole of the magnet. As the coating is urged away from the magnet, the force of gravity eventually causes the magnet to break away from the coating to be measured. The location of the magnet at this point is recorded which indicates the thickness of the coating on the magnetizable material.

Various pencil-shaped magnetic coating thickness gauges are disclosed in the following U.S. and foreign patents:

U.S. Pat. No. 4,392,305 of Nix et al which issued on July 12, 1983;
U.S. Pat. No. 2,625,585 of G. N. Krouse which issued on Jan. 13, 1953;
Austrian Pat. No. 215,169 of Bruna; and
French Pat. No. 2,310,548 of Simonot.

Each of these patents includes a pencil-like barrel having a magnet provided within the barrel. The magent is biased by a spring away from the coating to be measured. When the spring force exceeds the magnetic attraction of the magnet with the substrate, the gauge indicates the thickness of the coating to be measured.

In another type of spring biased gauge, a coil spring is tensioned until the magnetic attraction of a magnet with the surface of the coating to be measured is broken. Illustrative patents of this type of gauge include U.S. Pat. No. 3,716,779 of Akulov which issued on Feb. 13, 1973; U.S. Pat. No. 4,291,270 of Lukhvich et al which issued on Sept. 21, 1981; and U.S. Pat. No. 4,336,498 of Lukhvich et al which issued on June 22, 1982.

Representative patents of gauges which use electrical or electronic circuitry include U.S. Pat. No. 2,637,115 of Watson which issued on May 5, 1953; U.S. Pat. No. 4,005,360 of Ott which issued on Jan. 25, 1977; and U.S. Pat. No. 4,041,378 of Ott which issued on Aug. 9, 1977.

The need remains, however, for a gauge which is simple in design and construction and which provides an accurate measurement of a coating on a magnetizable surface without regard to variations in spring force or magnetization of a permanent magnet. Moreover, a gauge which does not require a source of electricity or which does not require a particular level of skill and dexterity in the operator is desired.

Accordingly, it is an object of the present invention to provide a method and aparatus for measuring the thickness of a coating on a magnetizable substrate which is simple in construction and operation.

Another object of the present invention is to provide a method and apparatus for measuring the thickness of a coating on a magnetizable substrate which does not require calibration of a magnet or of a spring for accuracy.

Yet another object of the present invention is to provide a strap gauge for measuring a coating thickness which is convenient for the operator to handle when not in use.

Still another object of the present invention is to provide a coating thickness gauge which can measure coatings on relatively small parts such as pinheads.

Yet still another object of the present invention is to provide a strap gauge for measuring a coating thickness which has essentially no moving parts and a high degree of reliability of operation.

These and other objects of the present invention are realized by the apparatus and method according to the present invention wherein a gauge for magnetically measuring a thickness of a surface coating comprises at least three magnets which define a first magnet, a second magnet and a third magnet. Each of the magnets has a north pole and a south pole with the magnets being flexibly connected to one another. A partial first coating having a first predetermined thickness is provided about a portion of the first magnet and a second partial coating having a second predetermined thickness is provided about a portion of the second magnet. The second predetermined thickness is greater than the first predetermined thickness. A third partial coating having a third predetermined thickness is provided about a portion of the third magnet with the third predetermined thickness being greater than the second predetermined thickness.

In a preferred embodiment, the gauge for magnetically measuring a thickness of a surface coating comprises a flexible strap of nonmagnetizable material defining a first end and a second end and defining a first side and a second side. The first end of the strap is releasably connectable to the second end. One end of the strap is provided with a member of a magnetizable material. At least three magnets are provided defining a first magnet, a second magnet and a third magnet with each of the magnets having a north pole and a south pole. Each of the magnets is fixedly received on the strap with one pole of each magnet extending generally perpendicularly from the first side of the strap and the other pole of each magnet extending generally perpendicularly from the second side of the strap.

A first partial coating having a first predetermined thickness is provided about one pole of the first magnet and a second partial coating having a second predetermined thickness is provided about one pole of the second magnet. The second predetermined thickness is greater than the first predetermined thickness. A third partial coating having a third predetermined thickness is provided about one pole of the third magnet with the third predetermined thickness being greater than the second predetermined thickness.

Preferably, the strap is provided with a buckle arrangement so that the strap may be worn about the wrist of the operator when not in use. The magnets are preferably generally circular in shape and may be provided with a flash coating of chrome plating of about ten-millionths of an inch so as to prevent a rusting or other corrosion of the magnets.

Preferably, all of the magnets are arranged with the north poles extending on one side of the strap and the south poles extending on the other side of the strap. Preferably, the coated side of each magnet is provided on the side of the strap which is adjacent the wrist of the wearer when the strap is not in use.

In another preferred embodiment, each magnet is positioned within a respective housing such that one end of the magnet is recessed from a rim on that side of the housing. The depth of the recesses vary from magnet to magnet in the same manner that the thickness of the partial coatings vary in the other preferred embodiment. The lifting member of this embodiment is applied against the rim over each magnet.

BRIEF DESCRIPTION OF THE DRAWINGS

The preferred embodiments of the present invention will be described with reference to the accompanying drawings wherein like members bear like reference numerals and wherein.

DETAILED DESCRIPTION OF THE PRESENT INVENTION

Figure 1:
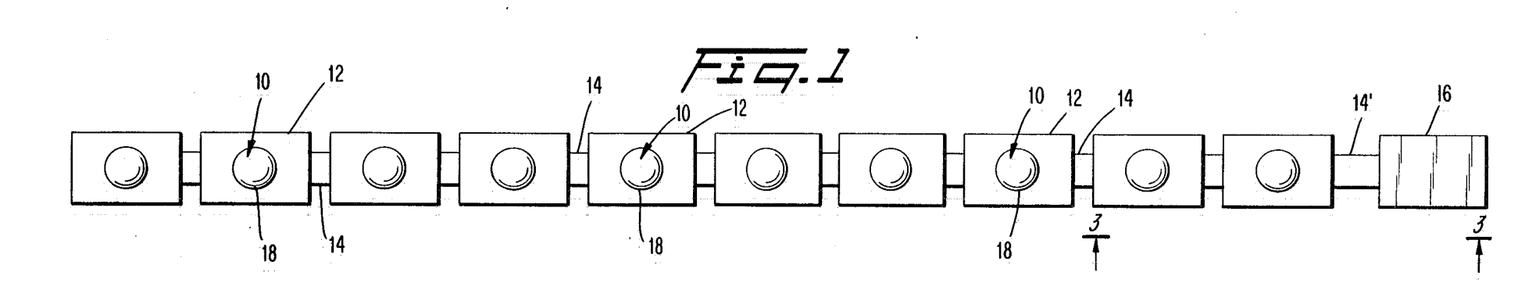
FIG. 1 is a top view of a first embodiment of the gauge according to the present invention.

With reference now to FIG. 1, a gauge according to the present invention includes a plurality of magnets 10 each of which is provided within a block of a nonmagnetizable material 12. Each of the blocks 12 is flexibly connected to one another by a coupling member 14. The coupling member may be of rubber or any other durable, flexible material.

Figure 3:
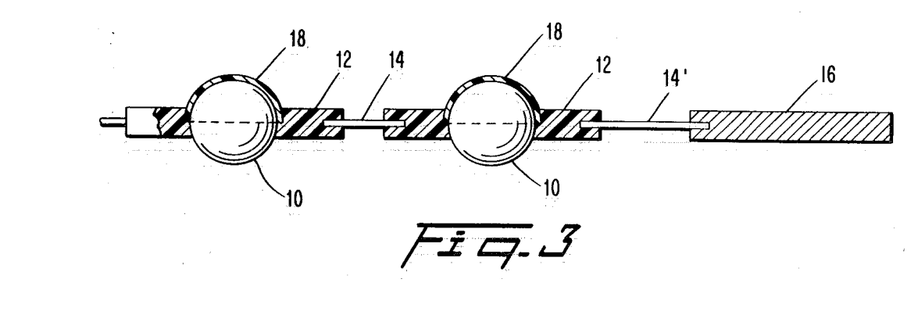
FIG. 3 is a cross-sectional view along the line 3—3 of FIG. 1.

In the embodiment of FIG. 1, ten magnets 10 are illustrated with each magnet being provided within a respective block of material 12. A lifting member includes a block 16 of a magnetizable material which is flexibly connected to one end of the series of blocks 12 by a coupling member 14'. With reference now to FIG. 3, the blocks 12 may be of a suitable plastic material which is molded about the magnets 10 and about the associated connector members 14. Each block 12 securely holds the magnet 10 and various other suitable, conventional manufacturing arrangements for fixedly mounting the magnet 10 in the block of material 12 will be readily apparent to one skilled in the art upon reading the present disclosure.

The block 16 of magnetizable material may be of steel or any of a number of particular magnetizable alloys. Preferably, the block 16 is of the same composition as is the substrate of the coating to be measured. Preferably also, the block 16 has a thickness which is comparable to the thickness of the substrate of the coating to be measured so that the block 16 will have a magnetization which is approximately equivalent to that of the substrate when the block 16 is used as a lifting member for the magnets 10.

Each of the magnets 10 is preferably generally spheroidal in shape with the poles of the magnet arranged so that one pole is provided on each side of the block 12. Each of the magnets 10 has a north pole and a south pole with the poles of each magnet preferably being oriented so as to extend perpendicularly with respect to the block 12. In the preferred embodiment, the north poles of each of the individual magnets 10 are oriented in the same direction with the south poles of each of the magnets 10 being oriented in the opposite direction.

Approximately one-half of each magnet 10 is provided with a partial coating 18 of a predetermined thickness. With reference again to FIG. 1, preferably the thickness of the coating on each magnet 10 increases or decreases sequentially along the series of magnets.

Figure 2:
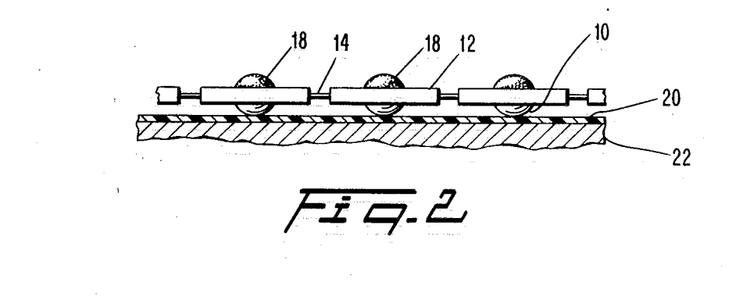
FIG. 2 is a side view of a portion of the gauge of FIG. 1.

With reference now to FIG. 2, the gauge according to the present invention is provided in contact with the surface coating 20 to be measured. The surface coating 20 may be magnetizable or nonmagnetizable and is provided on a substrate 22 of a magnetizable material. Typical compositions of the surface coating 20 to be measured include porcelain, paint, enamel, and various platings such as electro-nickel plating.

Figure 4:
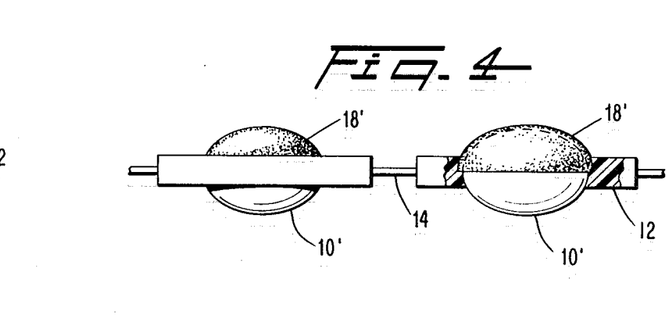
FIG. 4 is a side view in partial cross-section of a portion of another preferred embodiment of the gauge according to the present invention.

With reference now to FIG. 4, another preferred embodiment of the gauge according to the present invention includes magnets 10' which are elipsoidal in shape. The elipsoidal magnets 10' are considered to be generally spheroidal in configuration and are merely somewhat flattened so as to not protrude an undue amount above and below the blocks 12 of nonmagnetic material. Each of the magnets 10' is provided with a partial coating 18' having a predetermined thickness. The partial coating 18' of each magnet 10' is provided on only a portion of the magnet 10' as in the embodiment of FIG. 1.

So long as the coated substrate 22 has a mass which is at least as great as that of the block 16, the gauge of FIG. 1 will provide a reliable measurement of the surface coating 20 to be measured. If the substrate 22 is relatively small, however, or is irregularly shaped, such as a pinhead, for example, the use of the block 16 may provide unreliable measurements. This situation results from the relatively unequal effects of the magnetization of the magnets 10 on the relatively massive block 16 in comparison to a relatively small object such as a pinhead. In these circumstances, the block 16 is not utilized and instead an uncoated object substantially identical and preferably magnetically equivalent to the coated object is used in place of the block 16 as the lifting member.

Figure 5:
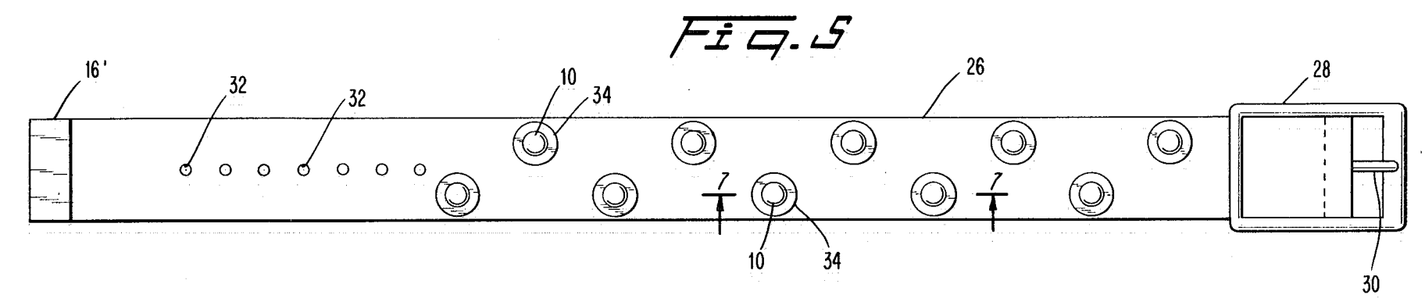
FIG. 5 is a top view of another preferred embodiment of the gauge according to the present invention.

With reference now to FIG. 5, a preferred embodiment of the present invention includes a strap of nonmagnetizable material 26 such as cloth or leather. The strap 26 preferably has a length corresponding to the circumference of an operator's wrist so that the strap can be readily received about the wrist of the operator. As in a conventional wristband for a watch, the band 26 is provided with a buckle 28 having a pin 30. The pin 30 is arranged so as to be received within one of a plurality of holes 32 located at the other end of the strap 26. The strap 26 is also provided with a lifting member 16' of a magnetizable material. The member 16' serves to facilitate the fastening and unfastening of the strap in the buckle 28 and the member 16' also participates in the operation of the gauge according to the present invention. As before, the member 16' preferably has a thickness which corresponds generally to the thickness of the substrate of the coating to be measured and the member 16 preferably is of the same material as is the substrate of the surface coating to be measured.

A plurality of magnets are arranged about the length of the strap 26 with each of the magnets 10 being fixedly received by the strap 26 within a fastening member 34. The member 34 may comprise a suitable conventional rivet in a manner which is readily obvious to one skilled in the art upon reading the present disclosure. The member 34 may be of any suitable conventional configuration so as to fixedly mount each magent 10 in the strap 26.

Figure 6:
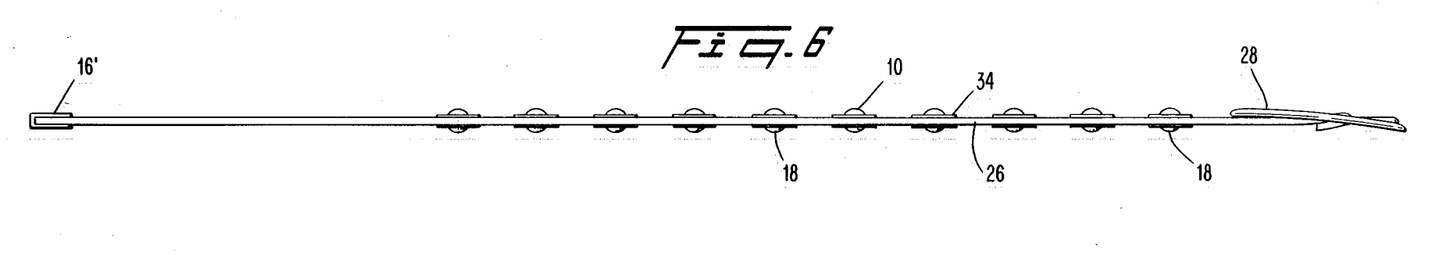
FIG. 6 is a side view of the gauge of FIG. 5.

With reference to FIG. 6, the strap 26 is preferably thin in cross-section so that the magnets 10 extend sufficiently above and below the surfaces of the strap 26. The magnets 10 must also extend sufficiently above and below the surfaces of the respective fastening members 34.

Figures 7, 8:
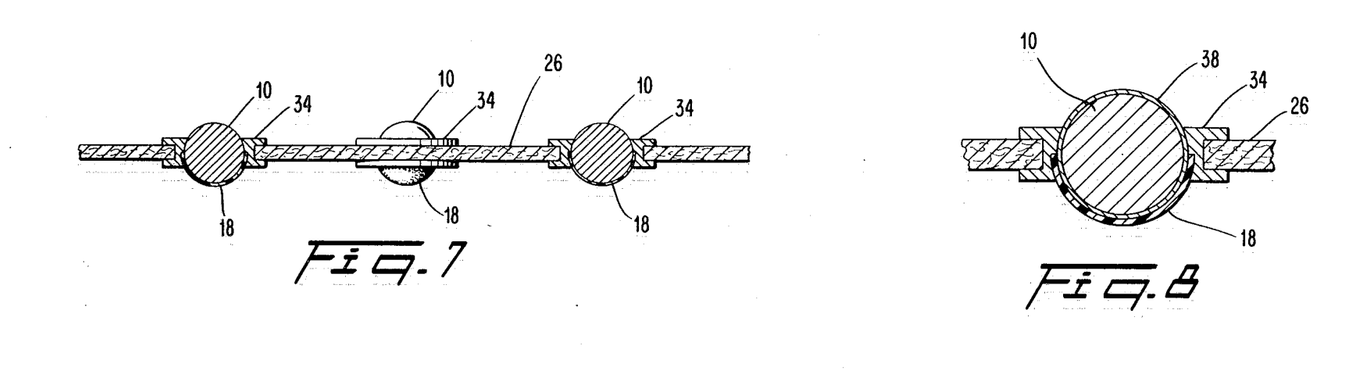
FIG. 7 is a view along the line 7—7 of FIG. 5.
FIG. 8 is a cross-sectional side view of a portion of another preferred embodiment of the gauge according to the present invention.

With reference now to FIG. 7, each of the rivets or other members 34 fixedly engages the strap 26 at an opening 36 provided in the strap 26. The member 34 may be deformed about the magnet 10 so as to fixedly receive the magnet 10 on the strap 26. Preferably, the member 34 is of a nonmagnetizable material so that the magnetic characteristics of the magnet 10 are not disturbed.

With reference again to FIG. 6, in the preferred embodiment, the partial coatings 18 of each of the magnets 10 are provided on the lower side of the strap 26. In this way, when the strap is worn by the operator and not in use, the partial coatings 18 will contact the skin of the wearer. Accordingly, corrosion of the magnets 10 resulting from the sweat of the individual will be reduced or eliminated.

If desired, however, each of the magnets 10 could be provided initially with a flash coating 38 of chrome plating. With reference to FIG. 8, the coating 38 of chrome would be provided about the entire surface of the magnet 10 before the coating 18 having a predetermined thickness is applied. In this way, corrosion of the magnet 10 of ferrous material would be effectively prevented. The coating 38 of chrome preferably has a thickness of only about ten-millionths of an inch and is relatively thin in comparison with the thickness of the partial coatings 18.

The particular thicknesses of the coatings of the magnets 10 in the preferred embodiments depend particularly upon the intended field of use for the gauge. For example, individuals engaged in the plating of ferrous or magnetic materials typically require a gauge having a sensitivity between 0.2 and 1.2 mils. Appliance manufacturers, however, frequently require gauges having a sensitivity between 4 and about 14 mils with coaters of automotive equipment frequently requiring gauges having a sensitivity between 0.5 and 5 mils. In most cases, the gauge will have a range of sensitivity falling somewhere between 0 to 80 mils. However, the gauge may be configured to have a sensitivity of even one inch of coating thickness.

Because the gauge uses individual magnets, the accuracy of the gauge is not affected by the relative strengths or weaknesses of the particular magnets. In this way, it is not necessary to insure that the magnets 10 have a magnetization which is equal to one another. Because of the configuration of the gauge, if a particular magnet 10 is significantly stronger or weaker than an adjacent magnet 10, the operation of the gauge will automatically account for this difference in magnetization.

The partial coating 18 of the magnets 10 preferably corresponds to the composition of the coating to be measured. With regard to nonmagnetizable coatings, however, it is less important that the coatings be of an identical composition and coatings of a plastic material may likely be suitable for most applications. In the case of a magnetizable coating, however, it is particularly important that the partial coatings 18 of the magnets 10 be of a composition which is quite similar to that of the coating to be measured and preferably identical in composition to the coating to be measured. For example, if a plating of electro-nickel is being measured, it is highly preferable to have the magnets 10 provided with a coating of electro-nickel plating of predetermined thicknesses especially since the electro-nickel plating has a magnetization characteristic.

In either case, however, the partial coatings 18 are provided on the first portion of each magnet in any suitable, conventional manner readily apparent to one skilled in the art of coatings.

Although the preferred embodiment utilizes magnets 10 of generally spheroidal configuration, other shapes for the magnets 10 are within the scope of the present invention and will be readily obvious to one skilled in the art upon reading the present specification.

Likewise, other mechanisms for flexibly connecting the magnets 10 to one another are within the scope of the present invention. For example, the magnets 10 could be provided in openings of a rubber tubing which is soft and pliable.

In the event that the sensitivity of the gauge is insufficient to measure a particular surface coating thickness, the range of the gauge may be extended by inserting, for example, a foil of plastic material having a predetermined thickness, i.e., 5 mils thick, between the coating of the magnets and the corresponding lifting member of the magnetizable material.

In operation, the plurality of magnets are provided on the surface coating to be measured with the uncoated portion of the magnets provided adjacent to the surface coating to be measured. The lifting member 16, 16' or, if appropriate, an uncoated member substantially identical (and magnetically equivalent) to the coated member to be measured is then brought into contact with one of the magnets 10. The lifting member is provided in contact with the partial coating of one of the magnets having a predetermined thickness. If the particular magnet 10 is lifted magnetically by the lifting member, then the thickness of the surface coating to be measured is known to be thicker than the predetermined thickness of the partial coating of the particular magnet being lifted. On the other hand, if the magnet is not lifted by the lifting member then the surface coating to be measured is known to have a thickness which is less than the predetermined thickness of the partial coating of the particular magnet.

Preferably, the measurement of a surface coating is accomplished by first providing the lifting member adjacent to either the magnet having the thinnest partial coating or the magnet having the thickest partial coating and the remaining magnets being tested sequentially. If the magnet having the thinnest predetermined partial coating is measured first, then the sequential testing need only be continued until one of the magents is not lifted by the lifting member. If the testing is begun with the magnet having the thickest partial coating, then the testing need only be continued until one of the magnets is lifted by the lifting member.

The thickness of the surface coating to be measured will then be determined to be somewhere between the thickness of the last two magnets of the series.

For example, when the magnet 10 having a partial coating of 2 mils is provided on a surface coating having a thickness of 2.2 mils, the lifting member will lift up the magnet having the 2 mils partial coating on the upper surface. If the next magnet in sequence has a predetermined partial coating thickness of 2.5 mils, the magnets will not be picked up from the 2.2 mils coated steel surface. Therefore, the operator knows that the surface coating of the steel surface is somewhere between 2 mils and 2.5 mils in thickness. For most operations, such accuracy is ordinarily sufficient.

A typical gauge according to the present invention may have ten magnets 10 with the coatings of each magnet having the following thicknesses:

TABLE I

| Magnet | Partial Coating Thickness |
|---|---|
| #1 | .4 mil |
| #2 | .8 mil |
| #3 | 1.2 mils |
| #4 | 1.6 mils |
| #5 | 2.0 mils |
| #6 | 2.4 mils |
| #7 | 2.8 mils |
| #8 | 3.2 mils |
| #9 | 3.8 mils |
| #10 | 4.4 mils |

In such a configuration, the thickness of the surface coating to be measured is approximated as follows depending upon which magnets are lifted by the lifting member.

TABLE II

| Magnet | Partial Coating Thickness | Approximate Thickness of Surface Coating to be Measured |
|---|---|---|
| #1 | .4 mil | .6 mil |
| #2 | .8 mil | 1.0 mil |
| #3 | 1.2 mils | 1.4 mils |
| #4 | 1.6 mils | 1.8 mils |
| #5 | 2.0 mils | 2.2 mils |
| #6 | 2.4 mils | 2.6 mils |
| #7 | 2.8 mils | 3.0 mils |
| #8 | 3.2 mils | 3.5 mils |
| #9 | 3.8 mils | 4.1 mils |
| #10 | 4.4 mils | |

Depending upon the weight of the strap 26 or of the blocks 12 and connectors 14, the effect of gravity on the accuracy of the gauge can be a factor. Moreover, the weight of the magnets 10 can also contribute to the problems resulting from gravity. Because of gravity, it is preferable that the magnets 10 be of a relatively small size so that the magnets 10 are not of undue weight yet it is also preferable that the magnets 10 have a relatively strong magnetization. Furthermore, it is preferable that the mechanism for flexibly connecting the magnets to one another be of lightweight material and readily flexible so as not to contribute unduly to the effect of gravity upon the accuracy of the gauge. In the preferred embodiment of the present invention, the weight of the strap 26 and magnets 10 is sufficiently small, the strap 26 is sufficiently flexible and the magnetization of the magnets 10 is sufficiently great so that the effect of gravity on the accuracy of the gauge is negligible.

Figure 9:
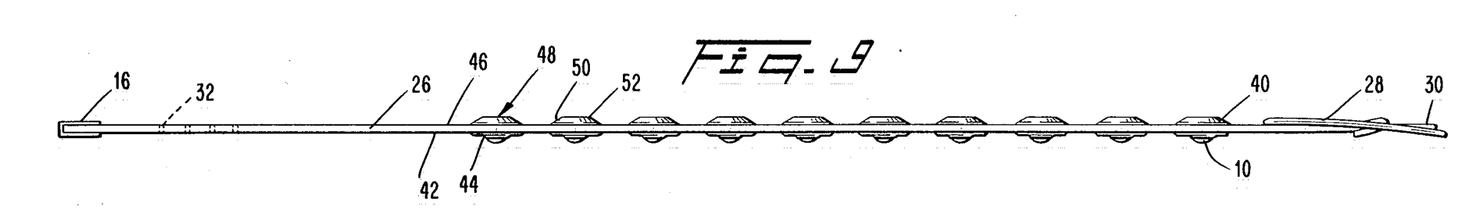
FIG. 9 is a side view of another preferred embodiment of the gauge constructed according to the present invention.
Figure 10:
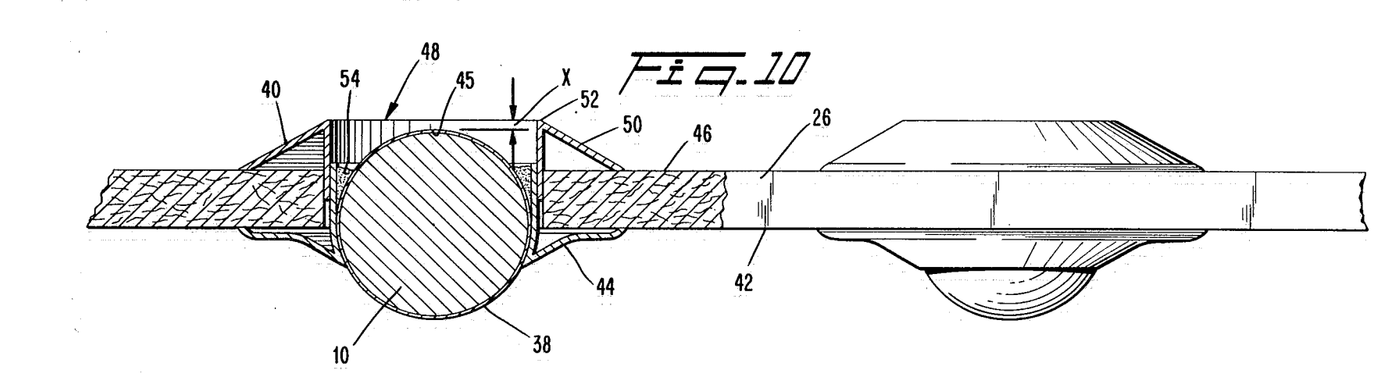
FIG. 10 is an enlarged, partially sectional side view of the gauge of FIG. 9.

Referring now to FIGS. 9 and 10, another preferred embodiment of the present invention includes a strap 26 of nonmagnetizable material which is provided with a buckle 28 at one end, a lifting member 16 at the other end and a plurality of holes 32 for receiving the pin 30 of the buckle 28. A plurality of magnets 10 are secured within two-piece rivets 40 positioned along a length of the strap 26. Rivets 40 are preferably constructed from nonmagnetizable material. Along the inner side 42 of the strap 26, each magnet 10 protrudes beyond the lower half 44 of the respective rivet 40 so to allow each magnet to directly contact the surface to be tested when the strap 26 is placed on the surface with its inner side 42 down. Along the outer side 46 of the strap 26, each magnet 10 is enclosed within an eyelet 48 formed at the upper half 50 of the respective rivet 40. Each magnet 10 is positioned within an eyelet 48 such that the uppermost portion 45 of the magnet 10 is recessed by a predetermined amount below a rim 52 at which the respective eyelet 48 terminates. This predetermined amount of recess is the dimension designated in the Figures as x, which incrementally increases (or decreases) from magnet to magnet along the strap 26 such that the plurality of magnets 10 present an associated range of values for the recess x. For example, gauges constructed according to this embodiment can be provided with a plurality of magnets whose recesses x correspond approximately to those dimensions given for the coatings listed in Table I.

In the subject embodiment, the lower half 44 of each rivet 40 is deformed against the respective magnet 10 to hold it in place. If desired, a bead 54 of bonding material, such as glue, is applied at the interface between the magnet 10 and the rivet 40 to further secure the respective magnet 10. As in the other embodiments, the buckle 28 and the holes 32 at the other end of the strap 26 allow the gauge 10 to be worn like a conventional wristband. However, in this embodiment, the eyelets 48 are positioned along the outer side 46 of the strap 26 when it is buckled so as to prevent perspiration from filing the eyelets 46 with residue. Also, each magnet 10 can be provided initially with a flash coating 38 of chrome plating to prevent corrosion.

In operation of this embodiment, the strap 26 is laid along a coated surface to be measured with the strap's inner side 42 facing down. Then, the lifting member 16 is placed in contact with and then withdrawn from each rim 52 of the plurality of magnets 10 until a pair of adjacent magnets 10 is found wherein one of the magnets of the pair is lifted along with the lifting member 16 and the other is not. The thickness of the surface coating is then correlated with the values of the recesses x associated with the subject pair of magnets 10. In this fashion, the recesses x of this embodiment serve a function similar to that of the partial coatings 18 of the previously discussed embodiments. However, this embodiment provides the advantage that the lifting member 16 is applied against the rim 52 of the rivet 40, which rim is structurally more substantial than a coating. Moreover, the material for the rim 52 can be selected from a wide range of wear resistant materials without regard to whether the material can be applied as a coating. Additionally, the rim 52 can be readily machined and/or polished to achieve a desired value for the recess x, and the rivet 40 provides both an expedient and cost effective method for attaching the magnets 10 to the strap 26.

Figure 11:
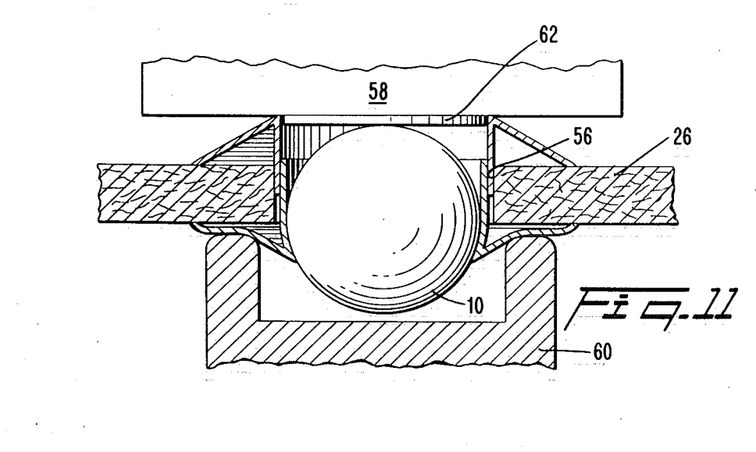
FIG. 11 is a sectional side view of the gauge of FIG. 9 at a stage during its manufacture.

Referring to FIG. 11, each magnet 10 is attached to a strap 26 according to a process wherein the lower half 44 and the upper half 50 of a rivet 40 are inserted through a hole 56 punched through the strap 26. A magnet 10 is then placed within the eyelet 48 of the rivet 40 so that its magnetic poles are oriented in relation to the strap 26 as previously discussed with the other embodiments. Before the rivet 40 is pressed between an anvil 58 and a cylindrical punch 60, a disc of foil 62 having a predetermined thickness corresponding to the desired dimension of recess x is placed within the eyelet 48 on top of the magnet 10. As the punch 60 is driven towards the anvil 58, the lower half 44 of the rivet 40 is deformed against the magnet 10, which action urges the magnet 10 against the foil disc 62 while securing the magnet 10 within the rivet 40. Upon completion of this pressing operation, the foil disc 62 is removed to leave an assembly wherein the magnet 10 is recessed from the rim 52 by an amount equal to the thickness of the foil disc 62. The rim 52 can be machined to further adjust the depth of the recess x as desired. Bonding material in the form of the bead 54 is applied after the foil disc 62 has been removed, but can also be applied at other stages of the process if desired. By the above process, the gauges 10 can be manufactured cost effectively, and the amount of recess for each magnet 10 can be expediently changed by merely changing the thickness of the foil disc 62.

Figure 12:
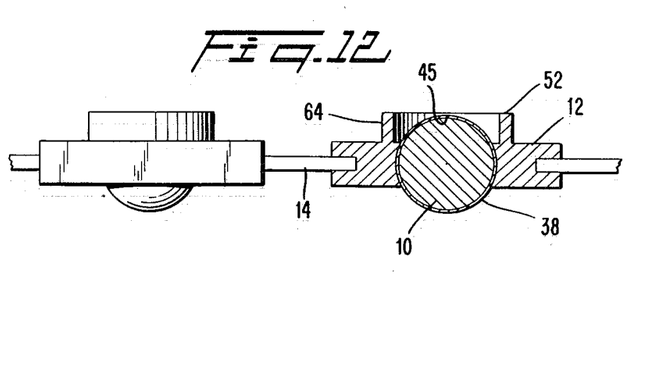
FIG. 12 is a partially sectional side view of another preferred embodiment of the present invention.

Referring now to FIG. 12, another preferred embodiment of the present invention includes a series of blocks 12 and connector members 14 for coupling the blocks 12, each block 12 securely holding individual magnets 10. The blocks 12 are constructed from a suitable plastic material which is molded about the magnets 10 and about the associated connector members 14. In this embodiment, however, each block 12 includes a cylindrical walled portion 64 which surrounds the upper half of the magnet 10 and terminates at a rim 52 which is situated from the uppermost portion 45 of the magnet 10 by a predetermined recess x. As with the previous embodiment, the recess x is incrementally varied from magnet to magnet along the strap 26. Also, each magnet 10 can be provided initially with a flash coating 38 of chrome plating to prevent corrosion.

Variations and changes to the present invention will become readily apparent to one skilled in the art upon reading the present specification. Thus, it is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A gauge for magnetically measuring a thickness of a surface coating in cooperation with a movable, magnetizable lifting member, comprising:
   a plurality of magnets;
   separate housings securing each magnet so that a lower surface portion of each magnet protrudes beyond a lower portion of its respective housing and an upper surface portion of each magnet is recessed by a predetermined amount from an upper portion of its respective housing, said predetermined amounts differing from magnet to magnet; and flexible means connecting said housings;

whereby said housings may be arranged along the surface coating with said lower surface portions of said magnetic contacting said surface coating and with said upper portions of said housings disposed so as to permit placement of said magnetizable lifting member into contact with each of said upper portions of said housings.

2. The gauge of claim 1 wherein said flexible connecting means comprises a strap of flexible material with a first side and a second side and wherein the poles of said magnets are oriented generally perpendicularly with respect to said first and second sides.

3. The gauge of claim 2 wherein said magnetizable lifting member is secured to said strap.

4. The gauge of claim 2 wherein said housings comprise rivets and said upper portion of each housing comprises an upper rim of said rivets.

5. The gauge of claim 4 wherein said magnets are generally spheroidal.

6. The gauge of claim 4 wherein said magnets are provided with a covering of a corrosion resistant material.

7. The gauge of claim 1 wherein said housings comprise plastic bodies formed about the respective magnets and said upper portion of each housing comprises an upper rim of said plastic bodies.

8. The gauge of claim 7 wherein said magnets are generally spheroidal.

9. The gauge of claim 7 wherein said magnets are provided with a covering of a corrosion resistant material.

10. A gauge for magnetically measuring a thickness of a surface coating, comprising:

a flexible strap of nonmagnetizable material, having a first end and a second end and a first side and a second side;

means for releasably connecting said first end of said strap to said second end;

a lifting member of a magnetizable material attached to said strap so as to be movable to locations along said strap when said first and second ends of the strap are disconnected;

a plurality of magnets having a north pole and a south pole; and rivets for fixedly securing said magnets at spaced locations along said strap, a first pole of each magnet being oriented generally perpendicularly from said first side of the strap and the other pole of each magnet being oriented generally perpendicularly from said second side of the strap, said first pole of each magnet being recessed within the respective rivet by a predetermined distance, said predetermined distance being different from magnet to magnet;

whereby said first and second ends of said strap may be connected so as to facilitate carrying of said gauge and whereby, when said first and second ends are disconnected, said strap may be laid upon said surface coating with said other poles of said magnets being placed in contact with said surface coating.

11. The gauge of claim 10 wherein said magnets are provided with a covering of a corrosion resistant material.

12. The gauge of claim 11 wherein the covering includes a chrome plating having a thickness of about 10 millionths of an inch.

13. The gauge of claim 12 wherein said means for releasably connecting said first end of said strap to said second end defines an inner side and an outer side for said strap and wherein said first pole of each magnet is recessed within the respective rivet at the outer side of said strap.

14. The gauge of claim 10 wherein the first pole of each magnet is recessed by said predetermined distance below a rim of its respective rivet.

15. A method of magnetically measuring a thickness of a surface coating, comprising the steps of:

providing a plurality of magnets each secured within a housing, wherein a portion of each magnet protrudes beyond one side of its respective housing and wherein each magnet is recessed from an opposite side of the respective housing by a predetermined distance;

placing the protruding portion of said magnets in contact with said surface coating;

contacting one of said housings at its opposite side with a magnetizable member;

lifting said magnetizable member in a direction away from said surface coating;

if the magnet secured within the contacted housing is magnetically lifted with said magnetizable member, performing the additional step of subsequently contacting with said magnetizable member the housing of another magnet, if any, having a predetermined distance which is greater than that of the one magnet and then lifting said magnetizable member in a direction away from said surface coating until one of said magnets is not magnetically lifted with said magnetizable member; and if the magnet secured within the contacted housing is not magnetically lifted with said magnetizable member, performing the step of subsequently contacting with said magnetizable member the housing of another magnet, if any, having a predetermined distance which is lesser than that of the one magnet and then lifting said magnetizable member in a direction away from said surface coating until one of said magnets is magnetically lifted with said magnetizable member.

16. A gauge for measuring thickness of a surface coating on a magnetizable substrate, said gauge comprising:

a plurality of magnets, each magnet having a lower surface portion and an upper surface portion;

a plurality of spacer means providing predetermined amounts of spacing over each upper surface region, said amounts of spacing differing from magnet to magnet;

means flexibly connecting said magnets in spaced relation to one another, whereby said magnets may be arranged along the surface coating with said lower surface portions of the magnets in contact with said surface coating; and a magnetizable lifting member movable into contact with each of said plurality of spacer means, whereby upon the lifting of the lifting member from contact with a selected one of said spacer means, magnetic attraction between said lifting member and the respective magnet may be compared against magnetic attraction between the respective magnet and said magnetizable substrate.

17. The gauge of claim 16 wherein said plurality of spacer means includes a housing securing each magnet to said flexible connecting means, said lower surface portion of each magnet protruding beyond a lower portion of its respective housing, said upper surface portion of each magnet recessed below an upper portion of its respective housing so as to provide said predetermined amount of spacing.

18. The gauge of claim 16 wherein said plurality of spacer means includes partial coatings on said magnets at said upper surface portions.

19. The gauge of claim 18 wherein said partial coatings are of an electro-nickel plating material.

20. The gauge of claim 18 wherein magnets are generally spheroidal in shape.

21. The gauge of claim 20 wherein said flexibly connecting means includes a strap of flexible material, magnetic poles of said magnets oriented perpendicularly with respect to first and second sides of said strap.

22. The gauge of claim 18 wherein said partial coatings cover only one of the magnetic poles of each magnet.

23. A gauge for measuring thickness of a surface coating on a magnetizable substrate in cooperation with a movable, magnetizable lifting member, comprising:
   at least three magnets defining a first magnet, a second magnet and a third magnet, each of said magnets having an upper surface portion and a lower surface portion;
   a first partial coating of a first predetermined thickness on said first magnet at said upper surface portion of the first magnet;
   a second partial coating of a second predetermined thickness on said second magnet at said upper surface portion of the second magnet, said second predetermined thickness being greater than said first predetermined thickness;
   a third partial coating of a third predetermined thickness on said third magnet at said upper surface portion of the third magnet, said third predetermined thickness being greater than said second predetermined thickness;
   means flexibly connecting said first magnet in spaced relation to said second magnet and said second magnet in spaced relation to said third magnet, whereby said magnets may be arranged along the surface coating with said lower surface portions of said magnets contacting said surface coating and with said partial coatings of said magnets disposed so as to permit placement of said magnetizable lifting member into contact with each of said partial coatings.

24. The gauge of claim 23 further comprising additional magnets and additional partial coatings of increasingly greater predetermined thicknesses on upper surface portions of said additional magnets, said flexibly connecting means flexibly connecting said first, second and third magnets, said additional magnets and said lifting member.

25. A gauge for magnetically measuring a thickness of a surface coating, comprising:
   a flexible strap of non-magnetizable material, having a first end, a second end, a first side and a second side;
   means for releasably connecting said first end to said second end;
   at least three magnets defining a first magnet, a second magnet and a third magnet;
   means affixing each of said magnets to said strap in spaced relation to each other and with a magnetic pole of each magnet oriented generally perpendicularly from the first side of the strap and the other magnetic pole of each magnet oriented generally perpendicularly from the second side of the strap so that like magnetic poles of said magnets are arranged along each side of said strap, said magnets protruding from said first and second sides of the strap;
   a first partial coating of a first predetermined thickness covering one pole of the first magnet;
   a second partial coating of a second predetermined thickness covering the like pole of the second magnet, the second predetermined thickness being greater than said first predetermined thickness;
   a third partial coating having a third predetermined thickness covering the like pole of the third magnet, said third predetermined thickness being greater than said second predetermined thickness; and
   a magnetizable lifting member affixed to said strap so as to be movable into contact with each partial coating when said first and second ends of the strap are disconnected;
   whereby said first and second ends of said strap may be connected so as to facilitate carrying of said gauge and whereby, when said first and second ends are disconnected, said strap may be laid upon said surface coating with uncoated poles of said magnets being placed in contact with said surface coating.

26. The gauge of claim 25 wherein said means for releasably connecting said first end to said second end defines an inner side for said strap and defines an outer side for said strap, said partial coatings arranged along said inner side of said strap.

27. The gauge of claim 25 wherein said magnets are generally spheroidal in shape and are affixed in openings in said strap.

28. The gauge of claim 27 wherein each of said magnets is provided with a covering of a corrosion resistant material.

29. The gauge of claim 28 wherein the covering includes a chrome plating having a thickness of about 10 millionths of an inch.

30. The gauge of claim 25 further comprising additional magnets and additional partial coatings of increasingly greater predetermined thicknesses covering like poles of said additional magnets.

31. The gauge of claim 30 wherein said magnets are provided with a chrome plating of a thickness of about 10 millionths of an inch.

32. A method of measuring thickness of a surface coating upon a magnetizable substrate, comprising the steps of:

flexibly connecting a plurality of magnets in spaced apart relationship to one another, said magnets having upper and lower surface portions;

providing predetermined amounts of spacing over each upper surface portion of said magnets by positioning a spacer adjacent each upper surface portion, said amounts of spacing differing from magnet to magnet;

placing said flexibly connected plurality of magnets on said surface coating with said lower surface portions of the magnets contacting said surface coating;

contacting the respective spacer of a selected magnet with a magnetizable lifting member and subsequently lifting said member in a direction away from said surface coating so as to compare magnetic attraction between said lifting member and said selected magnet against magnetic attraction between said selected magnet and said magnetizable substrate; and repeating said contacting and lifting steps with another magnet to determine the thickness of the surface coating according to which of the selected magnets is lifted with the lifting member during said lifting step and which of the selected magnets remains in contact with the surface coating during said lifting step.

33. A method of magnetically measuring a thickness of a surface coating comprising the steps of:

arranging a first portion of each of at least three magnets on the coating to be measured, said magnets including a first magnet, a second magnet and a third magnet, said first magnet being flexibly connected to said second magnet and said second magnet being flexibly connected to said third magnet, each of said first, second and third magnets having a partial coating of a predetermined thickness provided about a second portion of the magnet, said second portion being generally opposite of said first portion;

contacting the partial coating of a selected one of the magnets with a member of a magnetizable material;

lifting said member in a direction away from said coating to be measured;

if the one magnet is magnetically lifted with said member, performing the step of subsequently contacting with said member the partial coating of another magnet, if any, of a greater predetermined thickness than that of the one magnet and then lifting said member in a direction away from said coating to be measured;

if the one magnet is not magnetically lifted with said member, performing the step of subsequently contacting with said member the partial coating of another magnet, if any, of a lesser predetermined thickness than that of the one magnet and then lifting said member in a direction away from said surface coating.

34. The method of claim 33 further comprising the steps of:

arranging a first portion of each of fourth, fifth, sixth, seventh and eighth magnets on the surface coating to be measured, said first through eighth magnets being flexibly connected to one another, said first through eighth magnets being serially arranged on a strap with each magnet being provided with a partial coating of a predetermined thickness which is greater than the predetermined thickness of a preceeding magnet, said coating being provided about a second portion of the magnet;

if said contacted magnet is magnetically lifted with said member, performing the step of subsequently contacting with said member the partial coating of another magnet, if any, of the next greater predetermined thickness than that of the previously contacted magnet and lifting said member in a direction away from said surface coating until one of said magnets is not magnetically lifted with said member; and if said contacted magnet is not magnetically lifted with said member, performing the step of subsequently contacting with said member the partial coating of another magnet, if any, of the next lesser predetermined thickness than that of the previously contacted magnet and lifting said member in a direction away from said surface coating until one of said magnets is magnetically lifted with said member.

* * * * *